US 9,908,813 B2

(12) United States Patent
Gupta

(10) Patent No.: US 9,908,813 B2
(45) Date of Patent: Mar. 6, 2018

(54) SURFACE TREATMENT FOR CONCRETE REINFORCEMENT

(71) Applicant: UVic Industry Partnerships Inc., Victoria (CA)

(72) Inventor: Rishi Gupta, Victoria (CA)

(73) Assignee: UVic Industry Partnerships Inc., Victoria, BC (CA)

(*) Notice: Subject to any disclaimer, the term of this patent is extended or adjusted under 35 U.S.C. 154(b) by 0 days.

(21) Appl. No.: 14/722,579

(22) Filed: May 27, 2015

(65) Prior Publication Data

US 2015/0344367 A1 Dec. 3, 2015

Related U.S. Application Data

(60) Provisional application No. 62/003,475, filed on May 27, 2014.

(51) Int. Cl.
| | | |
|---|---|---|
| *E04C 5/01* | (2006.01) | |
| *C04B 16/06* | (2006.01) | |
| *E04C 5/03* | (2006.01) | |

(52) U.S. Cl.
CPC ...... *C04B 16/0691* (2013.01); *C04B 16/0633* (2013.01); *E04C 5/015* (2013.01); *E04C 5/017* (2013.01); *E04C 5/03* (2013.01)

(58) Field of Classification Search
CPC . C04B 16/0691; C04B 16/0633; E04C 5/015; E04C 3/00; E04C 5/03; E04C 5/017
USPC .......................................................... 52/834
See application file for complete search history.

(56) References Cited

U.S. PATENT DOCUMENTS

| | | | | |
|---|---|---|---|---|
| 3,332,244 A * | 7/1967 | McLean | ................. | B29C 70/20 405/259.5 |
| 4,285,612 A * | 8/1981 | Betti | ...................... | E01C 11/04 14/73.1 |
| 4,442,021 A * | 4/1984 | Burge | .................... | C04B 28/02 106/14.15 |
| 4,812,327 A * | 3/1989 | Hanazawa | ............... | C09D 5/08 427/375 |
| 4,818,573 A * | 4/1989 | Nishiwaki | ............ | E01D 19/083 156/71 |

(Continued)

FOREIGN PATENT DOCUMENTS

JP         10077588 A   *   3/1998

OTHER PUBLICATIONS

Hao et al., "Bond strength improvement of GFRP rebars with different rib geometries," *Journal of Zhejiang University Science A*, 8 (9), pp. 1356-1365, 2007.

(Continued)

*Primary Examiner* — Brent W Herring
(74) *Attorney, Agent, or Firm* — Klarquist Sparkman, LLP

(57) ABSTRACT

Described herein are reinforcing members for use in fabricating reinforced concrete, as well as methods of fabricating such reinforcing members. A reinforcing member can include a central reinforcement element and a supplementary cementitious material coated on the central reinforcement element. A method can including applying the supplementary cementitious material to the central reinforcement element, placing concrete around the reinforcing member, and allowing the concrete to cure. The supplementary cementitious material can be a pozzolan.

20 Claims, 2 Drawing Sheets

(56) References Cited

U.S. PATENT DOCUMENTS

| | | | | |
|---|---|---|---|---|
| 5,338,357 | A * | 8/1994 | Takai | C04B 16/06 106/686 |
| 5,613,334 | A * | 3/1997 | Petrina | E04C 5/07 52/223.1 |
| 5,727,357 | A * | 3/1998 | Arumugasaamy | D07B 1/025 428/377 |
| 5,755,486 | A * | 5/1998 | Wycech | B29C 70/66 296/187.02 |
| 6,233,826 | B1 * | 5/2001 | Wycech | B29C 44/1242 29/402.09 |
| 6,253,524 | B1 * | 7/2001 | Hopton | B29C 44/128 296/187.02 |
| 6,811,861 | B2 * | 11/2004 | Bank | E04C 5/07 428/107 |
| 7,771,529 | B1 * | 8/2010 | McPherson | C04B 14/22 106/716 |
| 7,823,356 | B2 * | 11/2010 | Tanaka | E04C 5/0645 52/414 |
| 8,413,396 | B2 * | 4/2013 | Oliva | E04C 5/165 403/305 |
| 9,028,606 | B2 * | 5/2015 | Andersen | B28B 1/52 106/638 |
| 9,162,399 | B2 * | 10/2015 | Gibson | B29C 70/52 |
| 2007/0175127 | A1 * | 8/2007 | Tanaka | E04C 5/0645 52/223.13 |
| 2008/0261042 | A1 * | 10/2008 | Brandstrom | B32B 5/12 428/375 |
| 2010/0031607 | A1 * | 2/2010 | Oliva | E04C 5/165 52/848 |
| 2011/0120349 | A1 * | 5/2011 | Andersen | B28B 1/52 106/712 |
| 2012/0066994 | A1 * | 3/2012 | Gibson | B29C 70/52 52/309.13 |
| 2012/0270971 | A1 * | 10/2012 | Andersen | B28B 1/52 524/5 |

OTHER PUBLICATIONS

Mindess et al., *Concrete*, 2$^{nd}$ Edition, Prentice Hall, NJ, pp. 603-604, 2003.

\* cited by examiner

SURFACE TREATMENT FOR CONCRETE REINFORCEMENT

CROSS REFERENCE TO RELATED APPLICATION

This application claims the benefit of U.S. Provisional Patent Application No. 62/003,475, filed May 27, 2014, which is hereby incorporated by reference in its entirety.

FIELD

The present disclosure relates generally to concrete structures, and more particularly to methods of improving the strength, efficiency, and durability of reinforced concrete structures.

BACKGROUND

Concrete is by some estimates the most-used man-made material on the planet when measured by weight. Concrete typically constitutes water, aggregate, and cementitious material. The aggregate component of concrete is typically made up of gravel, sand, and/or crushed rock conforming to standard size distribution profiles, or gradations. The cementitious component of concrete is often made up of Portland Cement, produced according to standard processes. The water, aggregate, and cement can be mixed, placed, and allowed to cure over a period of time to form finished structural concrete.

Concrete is known to have relatively high compression strength but relatively low tensile strength and ductility. Accordingly, structural concrete often incorporates reinforcement having higher tensile strength and ductility than concrete, with steel reinforcing bars (rebar) being a particularly well-suited reinforcing material. Typically, in fabricating reinforced concrete structures, a rebar cage can be created inside formwork, and the concrete can be placed and allowed to cure around the rebar within the formwork. The strength and efficiency of reinforced concrete can depend on the transfer of stresses between the concrete and the rebar, and thus the bond strength developed between them.

SUMMARY

In some embodiments, a method comprises placing concrete around a reinforcement element to which supplementary cementitious material is secured, and allowing the concrete to cure. In some examples, the reinforcement element is steel rebar. In some examples, the reinforcement element is a glass-fiber-reinforced polymer rebar. In some examples, the reinforcement element is a carbon-fiber-reinforced polymer rebar. In some examples, the reinforcement element comprises a plurality of randomly distributed discontinuous fibers made of steel, synthetic, glass, carbon, natural materials, or cellulose. In some examples, the supplementary cementitious material is a pozzolan. In some examples, the supplementary cementitious material is silica fume. In some examples, the supplementary cementitious material is metakaolin.

In some embodiments, a method comprises applying a binder to a reinforcement element and applying supplementary cementitious material to the reinforcement element with the binder, so as to secure the supplementary cementitious material to the reinforcement element. In some examples, the binder is an adhesive and the supplementary cementitious material is applied to the reinforcement element by mixing the supplementary cementitious material with the adhesive and applying the mixture to the reinforcement element. In some examples, the reinforcement element is a glass or carbon fiber-reinforced polymer rebar formed in a pultrusion process and the supplementary cementitious material is applied to the reinforcement element by mixing the supplementary cementitious material into a resin bath through which fibers of the fiber-reinforced polymer are pulled during the pultrusion process. In some examples, the reinforcement element is a fiber-reinforced polymer formed in a pultrusion process and the act of applying the supplementary cementitious material to the reinforcement element comprises spraying the supplementary cementitious material onto the fiber-reinforced polymer after fibers of the fiber-reinforced polymer are pulled through a resin bath during the pultrusion process. In some examples, the reinforcement element is a fiber-reinforced polymer rebar formed in a pultrusion process and the act of applying the supplementary cementitious material to the reinforcement element comprises spraying the supplementary cementitious material onto the fiber-reinforced polymer rebar after fibers of the fiber-reinforced polymer rebar are pulled through a die during the pultrusion process.

In some embodiments, a reinforcing member for use in fabricating reinforced concrete comprises a reinforcement element to which a supplementary cementitious material is coated. In some examples, the supplementary cementitious material is a pozzolan. In some examples, the reinforcing member further comprises an adhesive situated to secure the supplementary cementitious material to the reinforcement element. In some examples, the reinforcement element is coated with a mixture comprising an adhesive and the supplementary cementitious material. In some examples, the reinforcement element is a fiber of a fiber-reinforced polymer, and the supplementary cementitious material is contained in a polymer layer that at least partially coats the fiber. In some examples, the reinforcement element is a fiber-reinforced polymer rebar element, and the supplementary cementitious material at least partially coats the fiber-reinforced polymer rebar element.

In some embodiments a composition comprises a plurality of reinforcing members to which a supplementary cementitious material is secured, aggregate, and cement mixed with the plurality of reinforcing members and the aggregate so as to bind the aggregate and the reinforcing members. In some examples, the aggregate comprises rock, the reinforcing members comprise steel rebar, carbon fiber reinforced polymer, or glass fiber reinforced polymer, and the supplementary cementitious material comprises fly ash, silica fume, ground granulated blast furnace slag, metakaolin, zeolites, burned organic matter residues, volcanic ash, or volcanic pumice.

The foregoing and other objects, features, and advantages of the disclosure will become more apparent from the following detailed description, which proceeds with reference to the accompanying figures.

DETAILED DESCRIPTION

Figure 1:
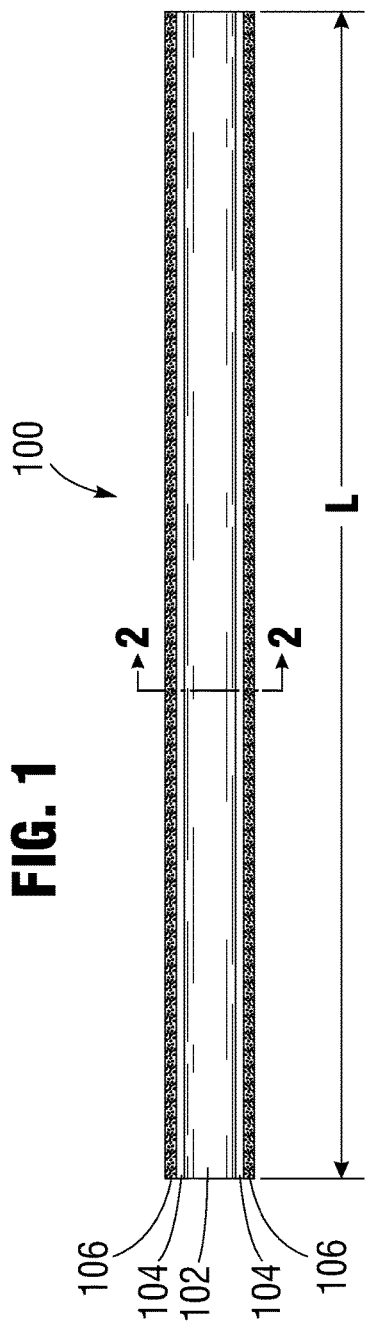
FIG. 1 is a side cross-sectional view of an exemplary SCM-coated reinforcing member.

Concrete is typically produced using water, aggregate, and cement. When these components are mixed, the water and cement begin to chemically react with one another by a process of hydration to form a solid and rigid matrix where cement binds the aggregate together. The chemical reaction begins upon mixing, and continues for days or months or even years, and the strength of the concrete increases as the chemical reaction continues. The strength of the resulting solid concrete can be influenced by many factors. As one example, the ratio of water-to-cement in the mixture can influence the strength of the resulting concrete. Typically, lower water-to-cement ratios produce stronger concrete.

Finished reinforced structural concrete can thus be made up of three component parts: rebar (or other suitable reinforcing material), aggregate, and cement binding the rebar and aggregate together. In finished concrete, a water-to-cement ratio gradient can exist at the interface between the cement and the aggregate and rebar, with the ratio increasing nearer the surfaces of the aggregate and rebar. This region can be referred to as the Interfacial Transition Zone or ITZ. It is thought that this region results from a "wall effect," in which cementitious particles cannot pack as densely adjacent the surfaces of the aggregate and rebar as they can in the absence of such surfaces, resulting in higher concentrations of water and calcium hydroxide (sometimes referred to as slaked lime) adjacent these surfaces. It is thought that this wall effect is exacerbated by the vibrations and shear stresses induced by the concrete mixing and pouring processes.

The ITZ represents a relative weak point in finished concrete, reducing the bond strength between the cement and the aggregate and rebar, and thus reducing the overall strength of a finished structural concrete component (or making it more expensive to build a component of the same strength). In particular, the existence of the ITZ reduces the bond strength between the concrete and the rebar, requiring the use of excess rebar (often the most expensive component of reinforced concrete) to compensate for the reduced bond strength. Additionally, many ITZs can be linked to one another, for example, where aggregate contacts rebar or other aggregate, further reducing the strength of the finished concrete.

Table 1 shows the typical pullout strength of some commercially used fibers in different matrices such as cement paste, mortar, and concrete, which is a function of the bond strength between the respective matrix and fiber. The results show that the pullout strength of the fibers (e.g., steel) is lower in concrete than it is in mortar or cement paste. Further, the pullout strength of synthetic fibers (nylon and polypropylene) is lower than many other types of fiber. To increase the pullout strength, some have attempted to introduce geometric deformations in the fibers, however, it has been found that such techniques have various disadvantages. For example, it can be difficult to introduce geometric deformations in many fiber types (especially synthetic fibers), and the deformations can introduce stress concentrations in the fibers, thereby reducing overall strength.

TABLE 1 typical bond strength of fibers in concrete (data obtained from Mindess et al., Concrete, Prentice Hall PTR, 2003).

| Matrix Material | Fiber Material | Pullout Strength (MPa) |
|---|---|---|
| Cement Paste | Asbestos | 0.8-3.2 |
| | Glass | 6.4-10.0 |
| | Polycrystalline alumina | 5.6-13.6 |
| | Steel | 6.8-8.3 |
| Mortar | Steel | 5.4 |
| Concrete | Steel | 4.2 |
| | Nylon | 0.14 |
| | Polypropylene | 1 |

The ITZ has also been found to be more permeable than the other regions of a finished concrete component, and as explained above, many ITZs can be linked to one another, for example, where aggregate contacts rebar or other aggregate. As a result, it has been found that the permeability of finished structural concrete can be 1000 times greater than that of solid cement alone. Because more permeable concrete deteriorates more rapidly (e.g., due to increased ingress of corrosive substances), the existence of the ITZ can decrease the overall lifespan of reinforced concrete structures.

In some cases, supplementary cementitious material (or "SCM") can be added to Portland Cement to form a blended cement and improve desirable characteristics of the resulting cured concrete, such as its strength and durability, while in some cases reducing cost. Pozzolanic materials, that is, materials reactive with calcium hydroxide to form cementitious materials, are examples of SCMs. Various types of natural and synthetic pozzolanic materials exist. Exemplary pozzolans include fly ash, silica fume, ground granulated blast furnace slag, metakaolin, zeolites, burned organic matter residues (such as those rich in silica), and various volcanic ashes and pumices composed primarily of fine volcanic glass (referred to as pozzolana). In some cases, the majority of the cementitious portion of the concrete mix can be comprised of such pozzolanic materials. Depending on the type and availability, use of large quantities of SCMs in place of Portland Cement can be expensive, however.

In some embodiments, a surface treatment or coating can be applied to a concrete reinforcing material such as steel rebar (including black steel rebar, carbon fiber reinforced rebar, and glass fiber reinforced rebar), carbon-fiber-reinforced polymer (CFRP), glass-fiber-reinforced polymer (GFRP), or other fiber material (including various steel, synthetic, carbon, cellulose, and glass fiber materials), prior to placing concrete around the reinforcement. In some cases, the surface treatment can comprise pozzolanic materials. In this way, the distinct advantages of pozzolanic SCMs can be realized in the ITZs surrounding the reinforcement, where the need for improved strength is greater than in other regions of the concrete, without having to incur the expense of providing the pozzolanic SCMs in the same concentration throughout the concrete. In this way, a pozzolanic SCM can be used much more efficiently, by providing it in the locations where it has the greatest potential to increase the overall strength of a reinforced concrete component by increasing the bond strength between the concrete and its reinforcement.

As noted above, calcium hydroxide, with which pozzolanic materials react to form cementitious materials, are often found in higher concentrations in the ITZ than in other regions of the concrete. For this reason, pozzolanic SCMs can be even more effective when used in a targeted fashion in the ITZ. For example, used in this way, the SCMs can produce superior hydration gels such as calcium silicate hydrate, resulting in a stronger and more durable bond.

Thus, providing pozzolanic material in the ITZ can improve the bond strength between concrete and its reinforcement, improving the composite behavior of the reinforced concrete and decreasing the total amount of reinforcement required to achieve given strength parameters. Providing pozzolanic material in the ITZ can also prevent or reduce the ingress of corrosive or otherwise harmful substances into the finished concrete component and in particular into the region of the concrete's reinforcement, thereby reducing corrosion or other deterioration, making the component more durable and extending its life expectancy.

In some embodiments, the reinforcement element comprises a plurality of randomly distributed discontinuous fibers made of one or more of steel, synthetic, glass, carbon, natural materials, and/or cellulose. In some examples, randomly distributed fibers are fibers which are mixed into wet concrete along with water, cement, and aggregate prior to placing the concrete and allowing it to cure. In some examples, randomly distributed fibers have randomized orientations, randomized lengths, and/or randomized shapes and curvatures. In other examples, randomly distributed fibers have uniform or substantially uniform orientations, lengths, and/or shapes and curvatures.

In some examples, discontinuous fibers do not extend from a first surface of a concrete element to a second surface of the concrete element. In some cases, discontinuous fibers extend less than 75%, or less than 50%, or less than 40%, or less than 30%, or less than 20%, or less than 10%, or less than 5%, or less than 2%, or less than 1% of the distance between a first surface of a concrete element and a second surface of the concrete element. In some cases, discontinuous fibers have a length less than 75%, or less than 50%, or less than 40%, or less than 30%, or less than 20%, or less than 10%, or less than 5%, or less than 2%, or less than 1% of the distance between a first surface of a concrete element and a second surface of the concrete element. In some cases, the second surface is opposed to the first surface, or is spaced apart from and substantially parallel to the first surface. In some cases, discontinuous fibers have a length less than 5 feet, or less than 4 feet, or less than 3 feet, or less than 2 feet, or less than 1 foot, or less than 9 inches, or less than 6 inches, or less than 3 inches.

In different embodiments, the surface treatment can be applied during manufacturing or after manufacturing of the reinforcement. In one embodiment, an adhesive (e.g., an epoxy) can be applied to reinforcement to be used in structural reinforced concrete (e.g., rebar), then an SCM such as a pozzolanic material can be applied to the adhesive. In another embodiment, an adhesive (e.g., an epoxy) can be mixed with an SCM such as a pozzolanic material, and the mixture can be applied to reinforcement to be used in structural reinforced concrete (e.g., rebar).

In another embodiment, GFRP or CFRP can be fabricated in a pultrusion process in which multiple fibers (glass or carbon, as the case may be) are unwound from respective spools and pulled through a resin bath and a die. An SCM such as a pozzolanic material can be mixed into the resin bath so as to be incorporated into the GFRP or CFRP during manufacturing. Alternatively or in addition, an SCM such as a pozzolanic material can be sprayed onto the GFRP or CFRP after the fibers are pulled through the resin bath, or after the fibers are pulled through the die.

In some embodiments, fine aggregate (e.g., sand) can be applied to the surface of the reinforcement rather than, or in addition to, an SCM. Applying a fine aggregate to the surface of the reinforcement can also improve the physical bond between the reinforcement and the concrete. In some embodiments, the reinforcement can have various cross sectional shapes. For example, round or flat rebar of various sizes can be used, and round, flat, crimped, or otherwise-shaped fibers of various sizes can be used.

Figure 2:
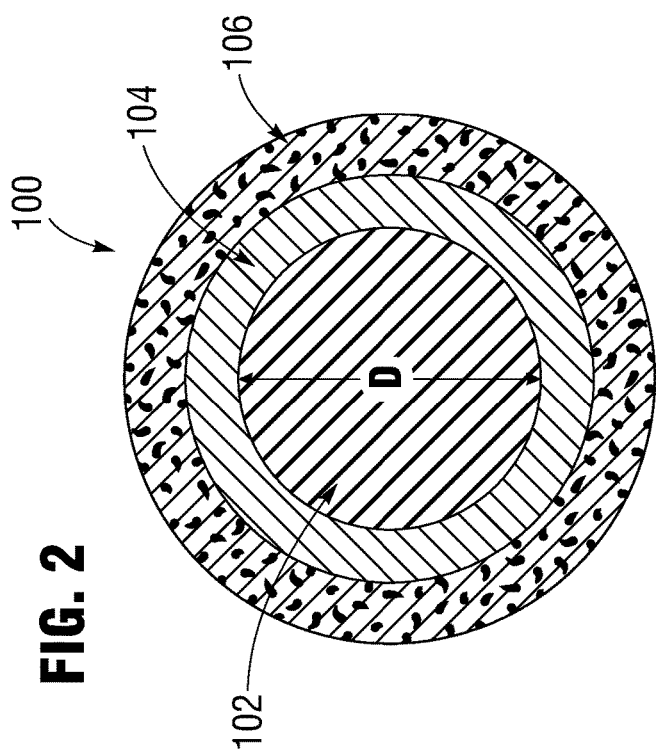
FIG. 2 is an end cross-sectional view of the exemplary SCM-coated reinforcing member of FIG. 1.

FIGS. 1 and 2 illustrate side and end cross-sectional views, respectively, of an exemplary SCM-coated reinforcing member 100. As shown, the SCM-coated reinforcing member 100 can include a central reinforcement element 102 having a diameter D and a length L, coated in an adhesive 104 and an SCM 106.

Figure 3:
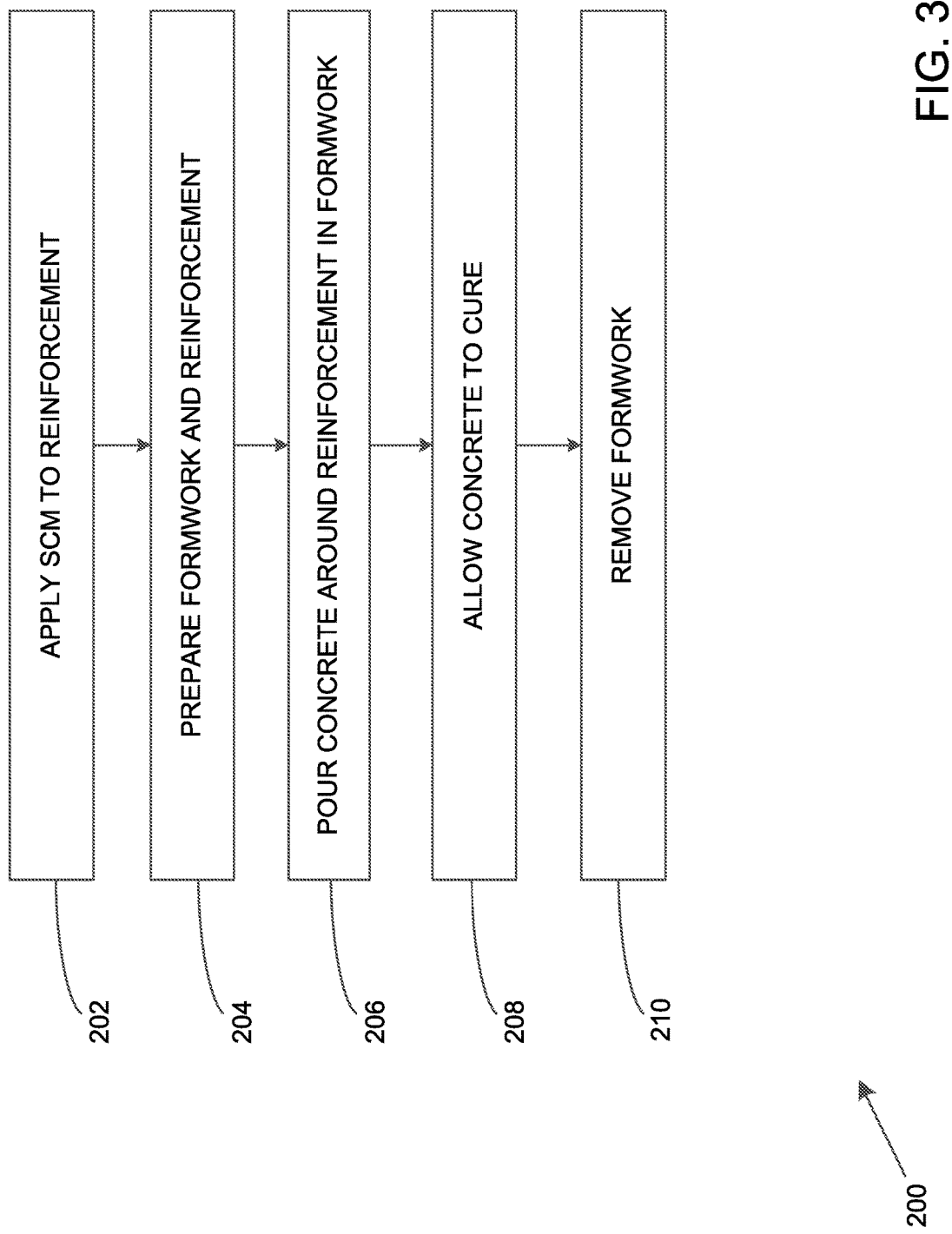
FIG. 3 is a flowchart illustrating an exemplary method.

FIG. 3 illustrates an exemplary method 200. As shown, at 202, an SCM can be applied to reinforcement for use in the fabrication of reinforced concrete. At 204, the reinforcement and formwork can be prepared for the placing of concrete. At 206, concrete can be placed into the formwork so that it surrounds the reinforcement. At 208, the concrete can be allowed to cure. At 210, the formwork can be stripped from the cured concrete.

The embodiments described herein can allow the fabrication of stronger, more efficient structural reinforced concrete. Thus, less reinforcement (often the most expensive component) can be used to achieve the same strength, leading to significant cost savings. The embodiments described herein can also allow the fabrication of more durable structural reinforced concrete. Thus, reinforced concrete structures can be designed to have longer expected lives and need not be replaced as frequently, leading to further significant cost savings.

The embodiments described herein can reduce the environmental impact of concrete construction. In particular, it has been estimated that cement production is responsible for between five and ten percent of global greenhouse gas emissions, so any reduction in consumption of cement can have a significant environmental impact. The technologies described herein can directly reduce cement consumption by replacing cement in concrete with a certain amount of SCMs (which are often recycled industrial wastes), and by reducing the total material required to fabricate a structural concrete element by improving the bond strength between concrete and steel. The technologies described herein can also reduce cement consumption by decreasing the frequency with which concrete structures must be replaced.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

In some examples, values, procedures, or apparatus' are referred to as "lowest," "best," "minimum," or the like. It will be appreciated that such descriptions are intended to indicate that a selection among many used functional alternatives can be made, and such selections need not be better, smaller, or otherwise preferable to other selections.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In view of the many possible embodiments to which the principles of the disclosure may be applied, it should be recognized that the illustrated embodiments are only preferred examples and should not be taken as limiting the scope of the disclosure. Rather, the scope of the disclosure is defined by the following claims.

What is claimed is:

1. A method, comprising:
   placing concrete around a reinforcement element having a coating that consists essentially of a polymer adhesive and a supplementary cementitious material, the coating comprising an inner layer consisting essentially of the polymer adhesive and an outer layer consisting essentially of the supplementary cementitious material; and
   allowing the concrete to cure.

2. The method of claim 1, wherein the reinforcement element is steel rebar.

3. The method of claim 1, wherein the reinforcement element is a glass-fiber-reinforced polymer rebar.

4. The method of claim 1, wherein the reinforcement element is a carbon-fiber-reinforced polymer rebar.

5. The method of claim 1, wherein the reinforcement element comprises a plurality of randomly distributed discontinuous fibers made of steel, synthetic, glass, carbon, natural materials, or cellulose.

6. The method of claim 1, wherein the supplementary cementitious material is a pozzolan.

7. The method of claim 1, wherein the supplementary cementitious material is silica fume.

8. The method of claim 1, wherein the supplementary cementitious material is metakaolin.

9. A method, comprising:
   applying a polymer adhesive to a reinforcement element to form an inner layer of a coating, the inner layer consisting essentially of the polymer adhesive; and
   applying supplementary cementitious material to the reinforcement element over the polymer adhesive, so as to secure the supplementary cementitious material to the reinforcement element, and such that the supplementary cementitious material forms a second layer of the coating, the second layer being radially outward of the first layer and consisting essentially of the supplementary cementitious material.

10. The method of claim 9, wherein the reinforcement element is a fiber-reinforced polymer rebar formed in a pultrusion process and the act of applying the supplementary cementitious material to the reinforcement element comprises:
    spraying the supplementary cementitious material onto the fiber-reinforced polymer after fibers of the fiber-reinforced polymer are pulled through a resin bath during the pultrusion process.

11. The method of claim 9, wherein the reinforcement element is a fiber-reinforced polymer rebar formed in a pultrusion process and the act of applying the supplementary cementitious material to the reinforcement element comprises:
    spraying the supplementary cementitious material onto the fiber-reinforced polymer rebar after fibers of the fiber-reinforced polymer are pulled through a die during the pultrusion process.

12. A reinforcing member for use in fabricating reinforced concrete, comprising a reinforcement element having a coating that consists essentially of a polymer adhesive and a supplementary cementitious material, the coating comprising an inner layer consisting essentially of the polymer adhesive and an outer layer disposed radially outwardly of the inner layer, the outer layer consisting essentially of the supplementary cementitious material.

13. The reinforcing member of claim 12, wherein the supplementary cementitious material is a pozzolan.

14. The reinforcing member of claim 12, wherein the polymer adhesive secures the supplementary cementitious material to the reinforcement element.

15. The reinforcing member of claim 12, wherein the reinforcement element is a fiber of a fiber-reinforced polymer, and the coating includes a layer consisting of the polymer adhesive that at least partially coats the fiber.

16. The reinforcing member of claim 12, wherein the reinforcement element is a fiber-reinforced polymer rebar element, and the coating that includes the supplementary cementitious material at least partially coats the fiber-reinforced polymer rebar element.

17. The reinforcing member of claim 12, wherein the supplementary cementitious material consists essentially of fly ash, silica fume, ground granulated blast furnace slag, metakaolin, zeolites, burned organic matter residues, volcanic ash, or volcanic pumice.

18. The reinforcing member of claim 12, wherein the inner layer of the coating is epoxy, and the outer layer of the coating is supplementary cementitious material.

19. A composition, comprising:
    a plurality of reinforcing members having respective coatings, the coatings including respective inner layers that consist essentially of a polymer adhesive and respective outer layers disposed radially outward of the inner layers, the outer layers consisting essentially of a supplementary cementitious material;
    aggregate; and
    cement mixed with the plurality of reinforcing members and the aggregate so as to bind the aggregate and the reinforcing members.

20. The composition of claim 19, wherein the aggregate comprises crushed rock, gravel, or sand, the reinforcing members comprise steel rebar, carbon fiber reinforced polymer, or glass fiber reinforced polymer, and the supplementary cementitious material comprises fly ash, silica fume, ground granulated blast furnace slag, metakaolin, zeolites, burned organic matter residues, volcanic ash, or volcanic pumice.

* * * * *